United States Patent
Chang et al.

(10) Patent No.: US 9,009,986 B1
(45) Date of Patent: Apr. 21, 2015

(54) JIG FOR FIREARM LOWER RECEIVER MANUFACTURE

(71) Applicant: 80 Percent Arms Inc., Santa Ana, CA (US)

(72) Inventors: Charles E. Chang, Coto de Caza, CA (US); Wayne R. Partington, Santa Ana, CA (US); Tilden A. Smith, II, Santa Ana, CA (US); Jules Johannes de Neve, Huntington Beach, CA (US)

(73) Assignee: 80 Percent Arms Inc., Santa Ana, CA (US)

( * ) Notice: Subject to any disclaimer, the term of this patent is extended or adjusted under 35 U.S.C. 154(b) by 0 days.

(21) Appl. No.: 14/534,413

(22) Filed: Nov. 6, 2014

Related U.S. Application Data

(60) Provisional application No. 61/902,357, filed on Nov. 11, 2013.

(51) Int. Cl.
  *B23Q 17/22* (2006.01)
  *G01B 5/14* (2006.01)
  *G01B 5/18* (2006.01)

(52) U.S. Cl.
  CPC ... *G01B 5/14* (2013.01); *G01B 5/18* (2013.01)

(58) Field of Classification Search
  CPC ............ B23Q 17/2233; B23Q 17/225; B23Q 17/226; B23Q 17/2225; B23Q 59/02; G01B 5/15; G01B 5/18
  USPC ........... 33/567, 568, 573, 628, 630, 632, 636, 33/640, 642
  See application file for complete search history.

(56) References Cited

U.S. PATENT DOCUMENTS

| | | | |
|---|---|---|---|
| 3,785,634 A * | 1/1974 | Denker | 33/568 |
| 4,155,383 A | 5/1979 | Welliver | |
| 4,630,656 A | 12/1986 | Collins | |
| 5,560,408 A * | 10/1996 | DiFranco | 33/567 |
| 5,725,038 A | 3/1998 | Tucker | |
| 6,557,730 B1 | 5/2003 | Kaye | |
| 6,742,558 B1 | 6/2004 | Witt | |
| 6,796,050 B2 * | 9/2004 | Haimer et al. | 33/636 |
| 6,813,843 B1 * | 11/2004 | Faubion | 33/638 |
| 7,269,901 B2 | 9/2007 | Robin | |
| 7,588,400 B2 | 9/2009 | Taylor | |
| 8,241,297 B2 * | 8/2012 | Ashman | 33/640 |
| 8,327,749 B2 | 12/2012 | Underwood | |
| 8,584,372 B2 * | 11/2013 | Stoffel | 33/628 |
| 2004/0065387 A1 * | 4/2004 | Smith | 33/638 |
| 2004/0179906 A1 * | 9/2004 | Hughes et al. | 408/1 R |
| 2005/0120573 A1 * | 6/2005 | Port | 33/630 |

(Continued)

*Primary Examiner* — G. Bradley Bennett
(74) *Attorney, Agent, or Firm* — Hackler Daghighian & Martino

(57) ABSTRACT

A machining tool assembly for manufacturing a firearm lower receiver includes a first and second side jig which are configured to be disposed on opposite sides of the firearm lower receiver and configured to removably attach to one another securing the firearm lower receiver therebetween. A drill block jig is removably attachable to the first and second side jigs disposed above the top surface of the firearm lower receiver, wherein the drill block jig comprises a plurality of through holes. A template spacer jig is removably attachable to the first and second side jigs disposed above the top surface of the firearm lower receiver, wherein the template spacer jig comprises a spacer aperture disposed through a template spacer thickness. A first and second pocket templates are removably attachable and disposed onto the template spacer jig. A router support plate is disposed onto either the first or second pocket templates.

33 Claims, 10 Drawing Sheets

(56) References Cited

U.S. PATENT DOCUMENTS

2010/0074701 A1* 3/2010 Kempen et al. ............... 408/1 R
2012/0005937 A1 1/2012 Milino
2015/0040414 A1* 2/2015 Nakamura et al. .............. 33/542

* cited by examiner

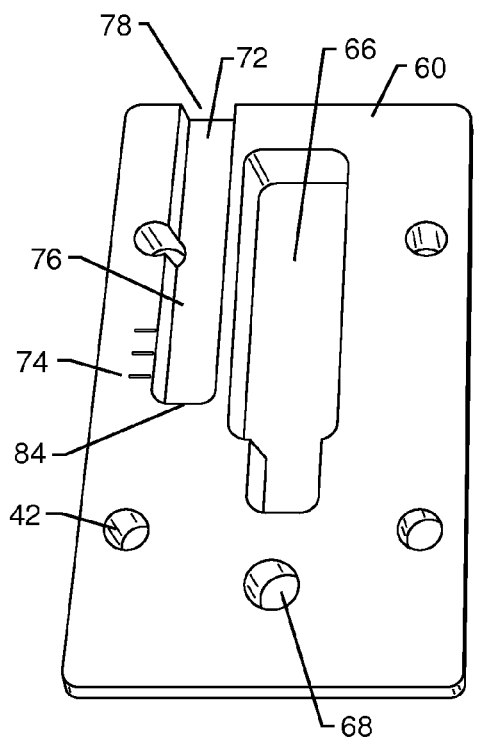
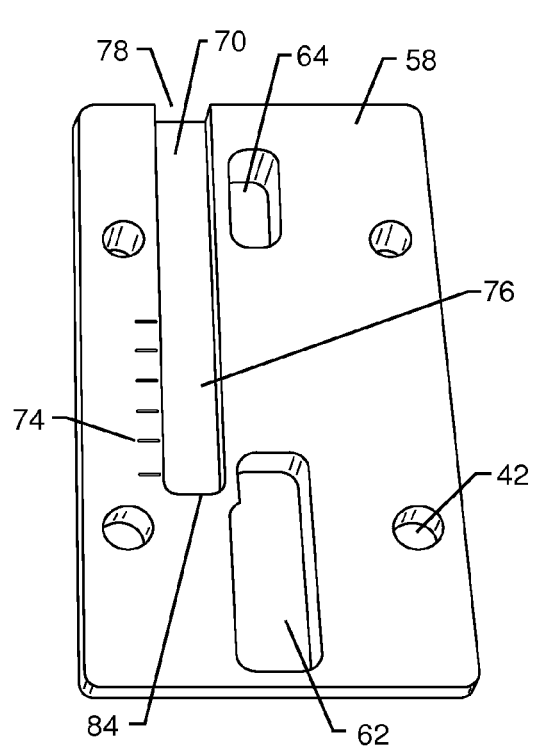
FIG. 15  FIG. 16
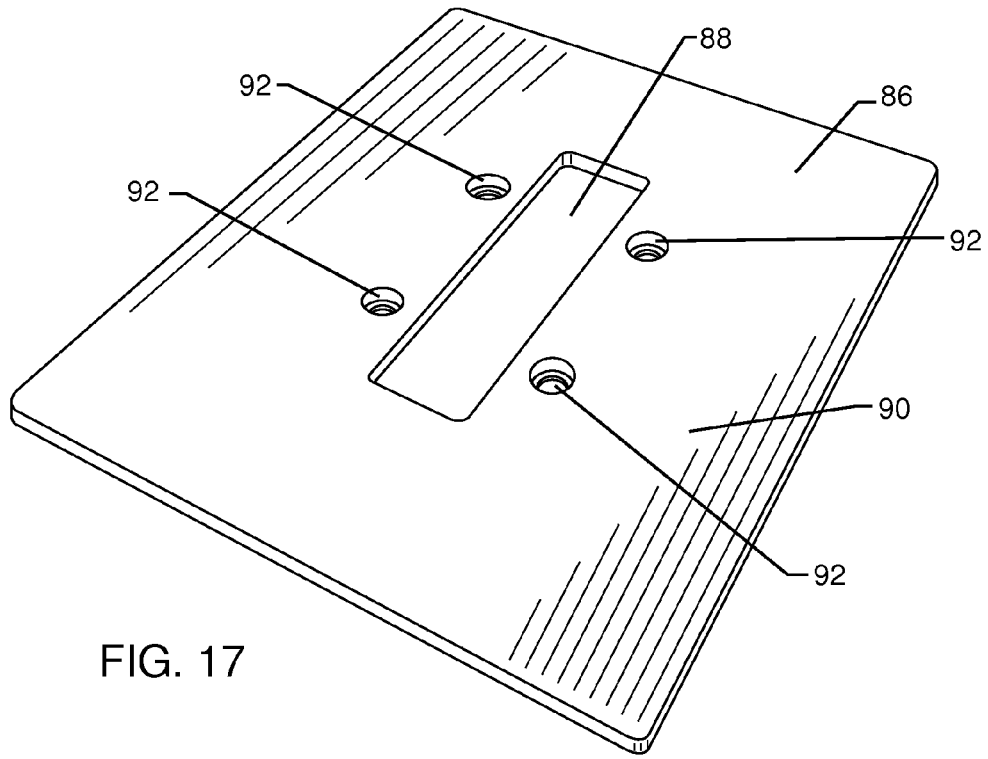
FIG. 17

JIG FOR FIREARM LOWER RECEIVER MANUFACTURE

CROSS-REFERENCE TO RELATED APPLICATIONS

This application claims priority to provisional application 61/902,357 filed on Nov. 11, 2013, the entire contents of which are hereby incorporated by reference.

FIELD OF THE INVENTION

The present invention generally relates to firearm manufacture. More particularly, the present invention relates to a jig that is sent to a customer along with an 80% completed lower receiver of an AR15 for the customer to finish manufacturing the firearm themselves.

BACKGROUND OF THE INVENTION

There exists a market for partially manufactured lower receivers for AR-15 firearms. An AR-15 is a semi-automatic rifle that has been in commerce and use for decades. The AR-15 is comprised of many individual parts. It is the lower receiver that is technically classified as a firearm and regulated as such. Partially manufactured lower receivers are referred to as 80% lower receivers, meaning that about eighty percent of the manufacturing has been completed. It is then up to the customer to manufacture the gun themselves by performing the last twenty percent of the drilling, milling or other various machining functions.

However, many customers do not have the equipment to properly manufacture the last twenty percent of the lower receiver. Also, the machining must be done precisely, which is hard for many customers to do.

Accordingly, there is a need for a device and/or method that simplifies the manufacturing process such that a customer can easily finish the last twenty percent of the lower receiver manufacturing accurately and easily. The present invention fulfills these needs and provides other related advantages.

SUMMARY OF THE INVENTION

One embodiment of a machining tool assembly includes a plurality of separate components for manufacturing a firearm lower receiver. The firearm lower receiver defines a top plane that is aligned with a top surface of firearm lower receiver but below a buffer tube receiver extension of the firearm lower receiver. The assembly includes a first side jig and a second side jig configured to be disposed on opposite sides of the firearm lower receiver and configured to removably attach to one another securing the firearm lower receiver therebetween. A drill block jig is removably attachable to the first and second side jigs disposed above the top surface of the firearm lower receiver, wherein the drill block jig comprises a plurality of through holes defining axes oriented perpendicular to the top plane of the firearm lower receiver when the drill block jig is attached to the firearm lower receiver. A template spacer jig is removably attachable to the first and second side jigs disposed above the top surface of the firearm lower receiver, wherein the template spacer jig comprises a spacer aperture disposed through a template spacer thickness, wherein the spacer aperture is oriented perpendicularly through the top plane of the firearm lower receiver when the template spacer jig is attached to the firearm lower receiver. A first pocket template is removably attachable and disposed onto the template spacer jig, wherein the first pocket template includes a first aperture disposed through a first pocket template thickness, wherein the first aperture is oriented perpendicularly through the top plane of the firearm lower receiver when the first pocket template is attached to the template spacer jig. A second pocket template is removably attachable and disposed onto the template spacer jig, wherein the second pocket template comprises a second aperture disposed through a second pocket template thickness, wherein the second aperture is oriented perpendicularly through the top plane of the firearm lower receiver when the second pocket template is attached to the template spacer jig. A router support plate is disposed onto either the first or second pocket template and attachable to the first and second side jigs through the first or second pocket templates and the template spacer jig, wherein the router support plate includes a router aperture disposed through a router support plate thickness, wherein the router aperture is oriented perpendicularly through the top plane of the firearm lower receiver when it is attached onto the first or second pocket templates, and wherein a top surface of the router support plate is disposed equal to or above the buffer tube receiver extension.

In other embodiments, the top surface of the router support plate may be at least 10 square inches or may be least 20 square inches or may be at least 40 square inches.

In another embodiment the router support plate includes a plurality of fixturing holes disposed through the router support plate thickness, where the plurality of fixturing holes are countersunk.

In another embodiment a depth gauge feature may be formed in at least one of the plurality of separate components, wherein the depth gauge feature includes a slot formed in a first surface of its respective part, where the slot has one end open to an edge surface, where the edge surface is perpendicular to the first surface. The slot may further include a closed end that is opposite of its one open end.

In another embodiment the depth gauge feature may include a plurality of depth indicators formed on the first surface or on an additional surface adjacent to the depth gauge feature.

In another embodiment the first aperture and second aperture may be of a different shape.

In another embodiment the router support plate may include a plurality of fixturing holes disposed through the router support plate thickness, where the plurality of fixturing holes are countersunk.

In another embodiment, the template spacer jig, the first pocket template and the second pocket template each may include a plurality of fixturing holes that are aligned with each other and aligned with the plurality of fixturing holes of the router support plate.

In another embodiment the plurality of fixturing holes for the template spacer jig, the first pocket template and the second pocket template when attached to the firearm lower receiver may be asymmetrical with respect to a left side and a right side of the firearm lower receiver.

One embodiment of an assembly tooling to manufacturer a firearm lower receiver has the firearm lower receiver defining a top plane that is aligned with a top surface of firearm lower receiver but below a buffer tube receiver extension of the firearm lower receiver. A drill block jig is removably attachable to the firearm lower receiver and disposed above the top surface of the firearm lower receiver, wherein the drill block jig includes a plurality of through holes disposed through a drill block jig thickness, wherein the plurality of through holes define axes which are oriented perpendicular to the top plane of the firearm lower receiver when the drill block jig is attached to the firearm lower receiver. A router support plate is removably attachable to the firearm lower receiver and disposed above the top surface of the firearm lower receiver, wherein a top surface of the router support plate is disposed parallel to the top plane of the of the firearm lower receiver and is further disposed at a height that is equal to or above an upper most portion of the buffer tube receiver extension. The router support plate includes a router aperture disposed through a router support plate thickness, and wherein the router aperture is oriented perpendicularly through the top plane of the firearm lower receiver when the router support plate is attached to the firearm lower receiver.

In another embodiment the top surface of the router support plate may be at least 10, 20 or 40 square inches.

In another embodiment the router support plate may include a plurality of fixturing holes disposed through the router support plate thickness, where the plurality of fixturing holes are countersunk.

In another embodiment a depth gauge feature may be formed in at least one of the plurality of separate components or in an additional component, wherein the depth gauge feature includes a slot formed in a first surface of its respective part, where the slot has one end open to an edge surface, wherein the edge surface is perpendicular to the first surface and wherein the slot further comprises a closed end that is opposite of its one open end.

In another embodiment the depth gauge feature may include a plurality of depth indicators formed on the first surface or on an additional surface adjacent to the depth gauge feature.

In another embodiment the router support plate may be configurable to comprise a first aperture in a first configuration and a second aperture in a second configuration.

In another embodiment the first aperture and second aperture may be a different shape.

In another embodiment a first pocket template may be removably attachable to the router support plate, wherein the first pocket template includes a first aperture disposed through a first pocket template thickness.

In another embodiment a second pocket template may be removably attachable to the router support plate, wherein the second pocket template includes a second aperture disposed through a second pocket template thickness, wherein the first aperture includes a different shape from the second aperture.

One embodiment of an assembly includes a plurality of separate parts for manufacturing a firearm lower receiver. The firearm lower receiver defines a top plane that is aligned with a top surface of firearm lower receiver but below a buffer tube receiver extension of the firearm lower receiver. A drill block jig is removably attachable to the firearm lower receiver and disposed above the top surface of the firearm lower receiver, wherein the drill block jig includes a plurality of through holes disposed through a drill block jig thickness, wherein the plurality of through holes defines axes which are oriented perpendicular to the top plane of the firearm lower receiver when the drill block jig is attached to the firearm lower receiver. A router support plate is removably attachable to the firearm lower receiver and disposed above the top surface of the firearm lower receiver, wherein a top surface of the router support plate is disposed parallel to the top plane of the of the firearm lower receiver and is further disposed at a height that is equal to or above an upper most portion of the buffer tube receiver extension. The router support plate includes a router aperture disposed through a router support plate thickness, and wherein the router aperture is oriented perpendicularly through the top plane of the firearm lower receiver when the router support plate is attached to the firearm lower receiver. A depth gauge feature is formed either in the drill block jig or in the router support plate or in an additional part, wherein the depth gauge feature includes a slot formed in a first surface of its respective part, where the slot has one end open to an edge surface, wherein the edge surface is perpendicular to the first surface and wherein the slot further comprises a closed end that is opposite of its one open end.

In another embodiment the top surface of the router support plate may be at least 10, 20 or 40 square inches.

In another embodiment the router support plate may include a plurality of fixturing holes disposed through the router support plate thickness, where the plurality of fixturing holes are countersunk.

In another embodiment the depth gauge feature may include a plurality of depth indicators formed on the first surface or on an additional surface adjacent to the depth gauge feature.

In another embodiment the router support plate may be configurable to include a first aperture in a first configuration and a second aperture in a second configuration.

In another embodiment the first aperture and second aperture may be a different shape.

In another embodiment a first pocket template may be removably attachable to the router support plate, wherein the first pocket template imcludes a first aperture disposed through a first pocket template thickness.

In another embodiment a second pocket template may be removably attachable to the router support plate, wherein the second pocket template includes a second aperture disposed through a second pocket template thickness, wherein the first aperture comprises a different shape from the second aperture.

BRIEF DESCRIPTION OF THE DRAWINGS

The accompanying drawings illustrate an embodiment of the invention. In such drawings:

FIG. 15 is a top perspective view of the structure of FIG. 10;

FIG. 16 is a top perspective view of the structure of FIG. 9;

FIG. 17 is a perspective view of an embodiment of a router support plate;

DETAILED DESCRIPTION OF THE PREFERRED EMBODIMENTS

Figure 1:
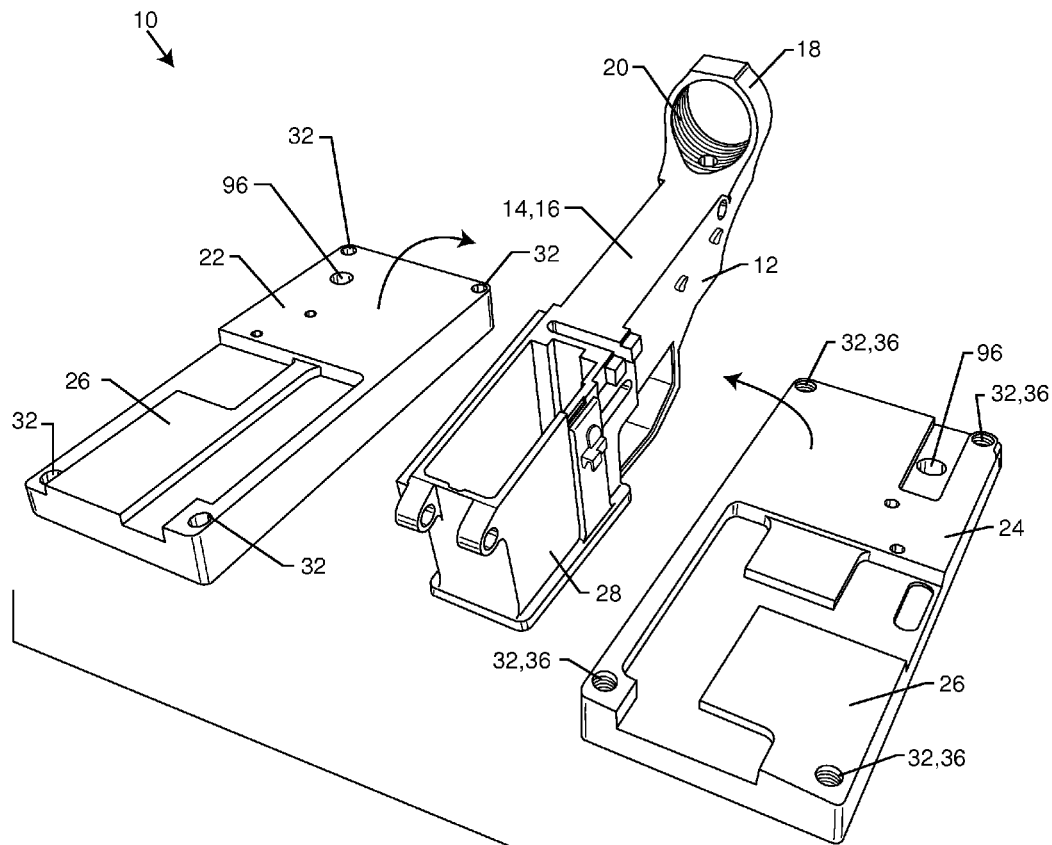
FIG. 1 is a perspective view of a lower receiver and a first and second side jig.
Figure 2:
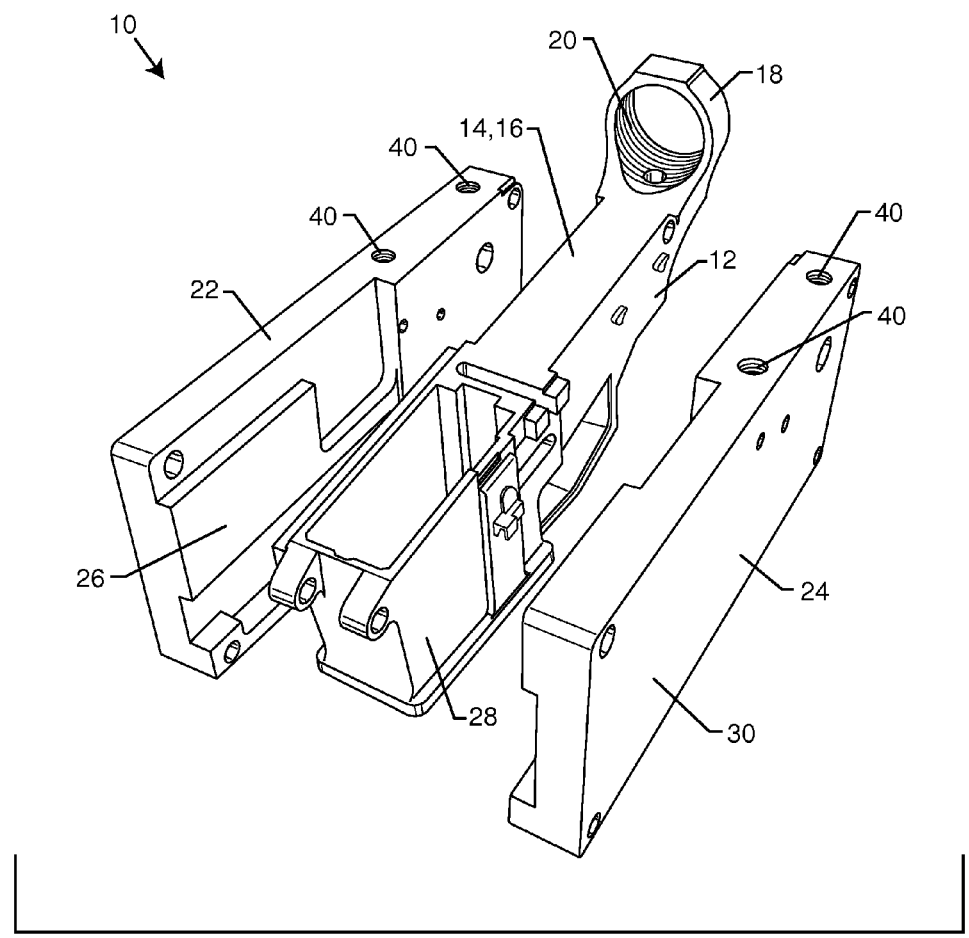
FIG. 2 is a perspective view of the structure of FIG. 1 now where the side jigs are ready to be fastened together.
Figure 3:
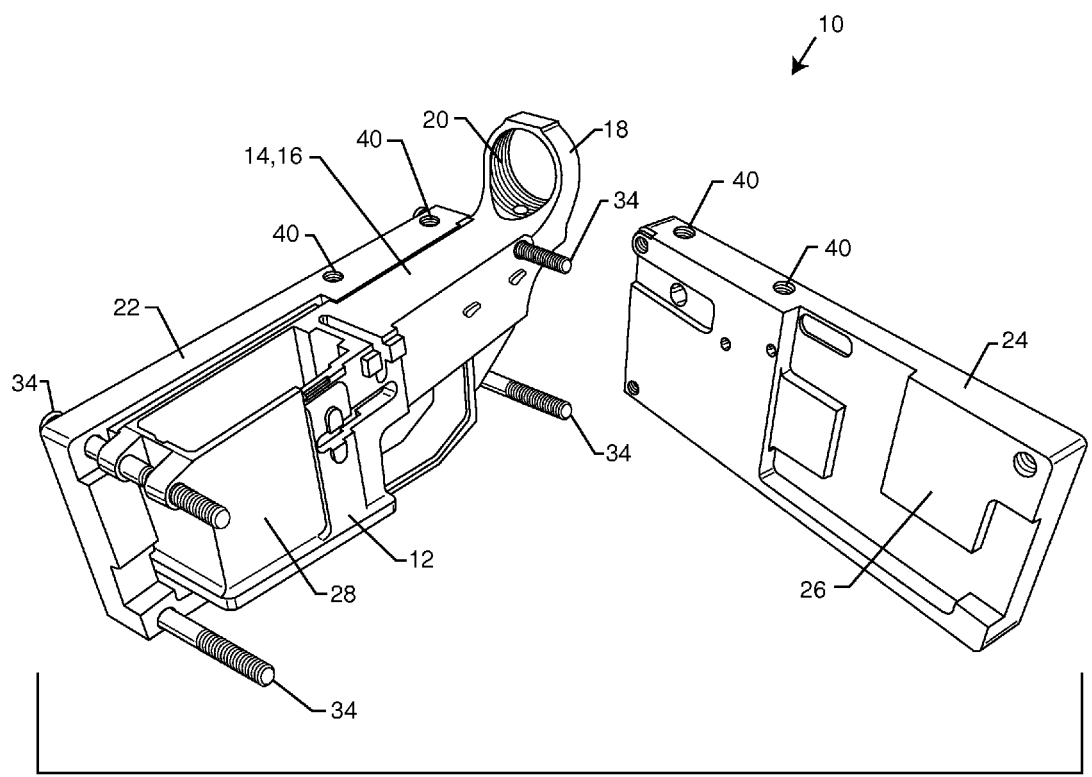
FIG. 3 is a perspective view of the structure of FIG. 1 with the first side jig assembled to the lower receiver.
Figure 4:
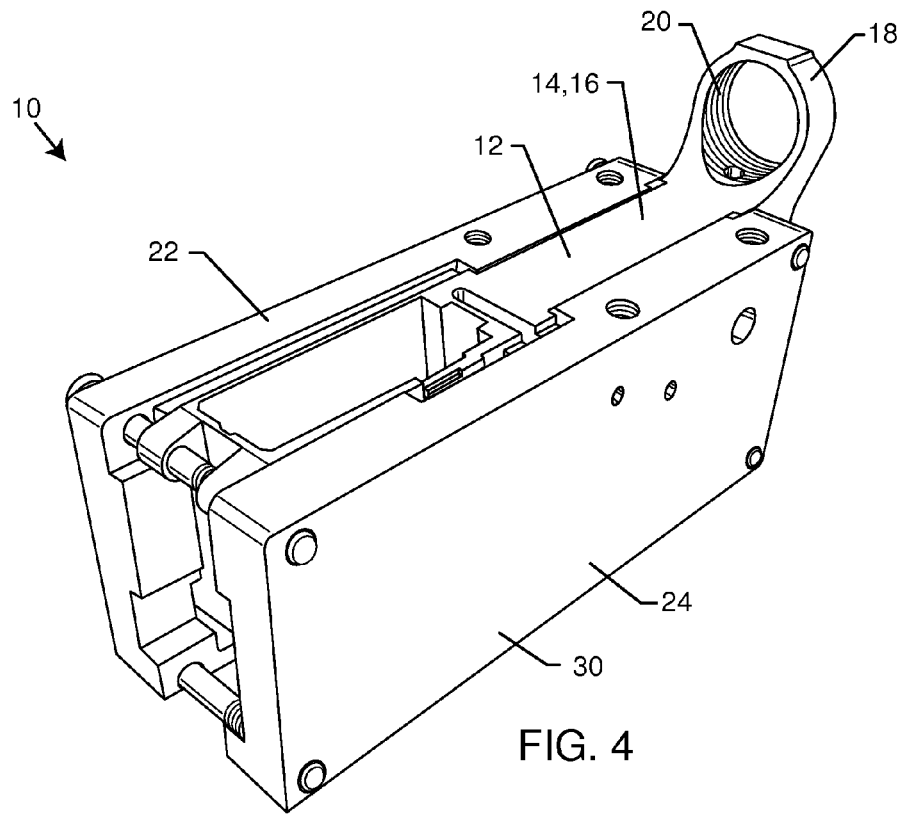
FIG. 4 is a perspective view of the structure of FIG. 1 now with the side jigs attached by fasteners.
Figure 5:
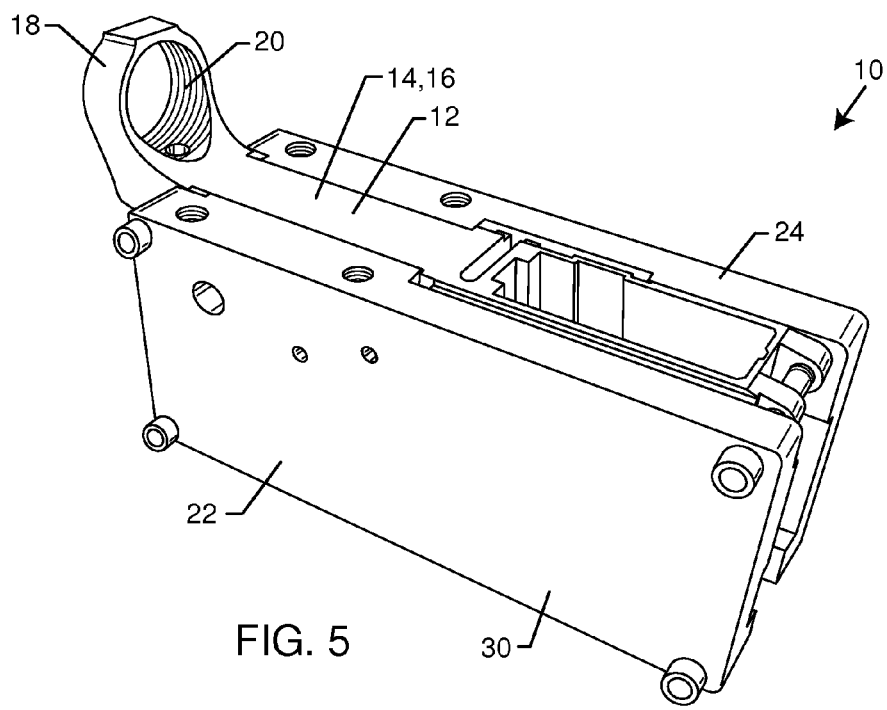
FIG. 5 is a perspective view of the structure of FIG. 5 from a different angle.
Figure 6:
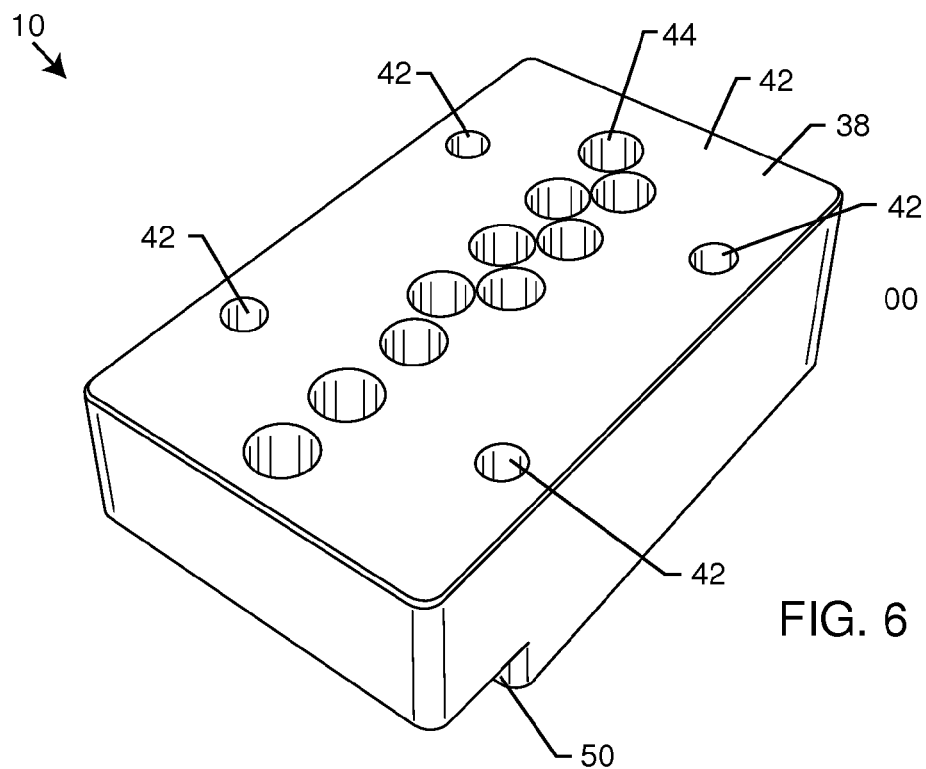
FIG. 6 is a top perspective view an embodiment of a drill block jig
Figure 7:
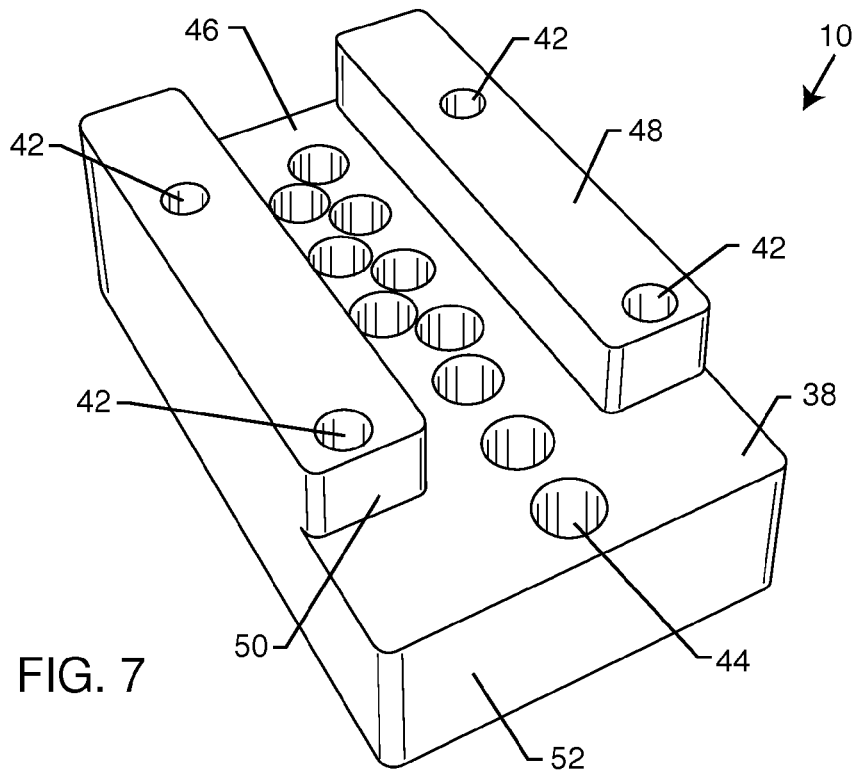
FIG. 7 is a bottom perspective view of the drill block jig structure of FIG. 6.

Part of the last twenty percent of manufacture of a lower receiver requires the use of a mill or a drill press that is acting like a mill. However, many customers do not have access to a mill as mills are extremely large and expensive machines. The customer then attempts to use a drill press as a mill. This is extremely difficult to do as a drill press is not designed to properly mill in a direction perpendicular to the drilling axis. This is also complicated because the customer must manually move the part relative to the drill press. Manually moving the part is difficult to do accurately as compared to a proper milling machine. This complication frequently leads to a frustrated customer and a destroyed/ruined lower receiver.

The embodiments taught herein solves this problem and eliminates the need for a mill or a drill press as a mill. The embodiments herein are a novel jig assembly that is designed to accept the use of a router. A router is similar to a mill in that it is designed to move the cutter (end-mill bit) in a direction perpendicular to the axis of rotation. Furthermore, a router is a hand held device that many customers have or can easily and cheaply purchase or even borrow/rent from a store or colleague.

The embodiments herein also have integrated depth settings for various drilling operations built into the jigs. In the past, the customer would require special and expensive measurement tools to make sure the drilling processes and milling processes were done to an exact measurement. Now, the jig has built in recesses that are used to set various stops for the drills/mills such that a proper depth is assured. The jig template pieces allows the proper final depth setting and facilitate incremental depth settings from depth set markings before achieving the final depth.

Refer to the figures for further details regarding the embodiments taught herein. The FIGS. 1-21 clearly show the various parts that comprise the various embodiments of the novel jig assembly and also the method used to manufacture the lower receiver.

It is to be understood by those skilled in the art that the present invention can be applied to a range of lower receiver or gun types/firearms and is not limited in applicability only to the AR-15.

One embodiment of a machining tool assembly 10 includes a plurality of separate components for manufacturing a firearm lower receiver 12. The firearm lower receiver 12 defines a top plane 14 that is aligned with a top surface 16 of firearm lower receiver 12 but below a buffer tube receiver extension 18 of the firearm lower receiver 12. The buffer tube receiver extension 18 rises above the top plane 14/top surface 16 and has an internal thread 20 that is used to connect to other various components that make up the final assembly of the firearm.

The assembly 10 includes a first side jig 22 and a second side jig 24 configured to be disposed on opposite sides of the firearm lower receiver 12 and configured to removably attach to one another securing the firearm lower receiver there between. The words "removably attach" as used herein means to be able to temporarily fixture, hold or clamp such that it does not require bonding or welding to hold it together. The side jigs 22 and 24 are shaped/formed such that the inner surfaces 26 match at least a portion of the outer side surfaces 28 of the lower receiver 12. In this way, when the side jigs 22 and 24 are clamped/pressed together they can securely capture and hold the lower receiver 12 there between. The outer surfaces 30 of the side jigs 22 and 24 are predominantly flat. The flat outer surfaces 30 provide a smooth and flat surface for a clamp to grab and secure the assembly to a table or rigid structure. It would be awkward and cumbersome to place the firearm lower receiver 12 directly into a clamp. It is the first and second side jigs 22 and 24 that capture the lower receiver 12 such that it can easily be secured into a fixed position for later machining and work.

The side jigs have through holes 32 that are used to secure fasteners 34 there through. There are a multitude of ways one skilled in the art can attach the side jigs 22 and 24 in a fixed manner through the use of fasteners or clamps. As shown herein, the fasteners 34 are socket head cap screws that go through the first side jigs 22 and then thread into the second side jig 24. The cap screws could have been longer and penetrated through both side jigs and then be attached using a nut or other comparable structure. To simplify the part count of the final assembly this embodiment used an internal thread 36 on the second side jig 24.

The side jigs 22 and 24 are typically machined from aluminum or other comparable metal that may be machined. However, it could also be possible to make the side jigs and other components taught herein from polymers or other composite structures such as fiberglass, carbon fiber or even wood.

Figure 8:
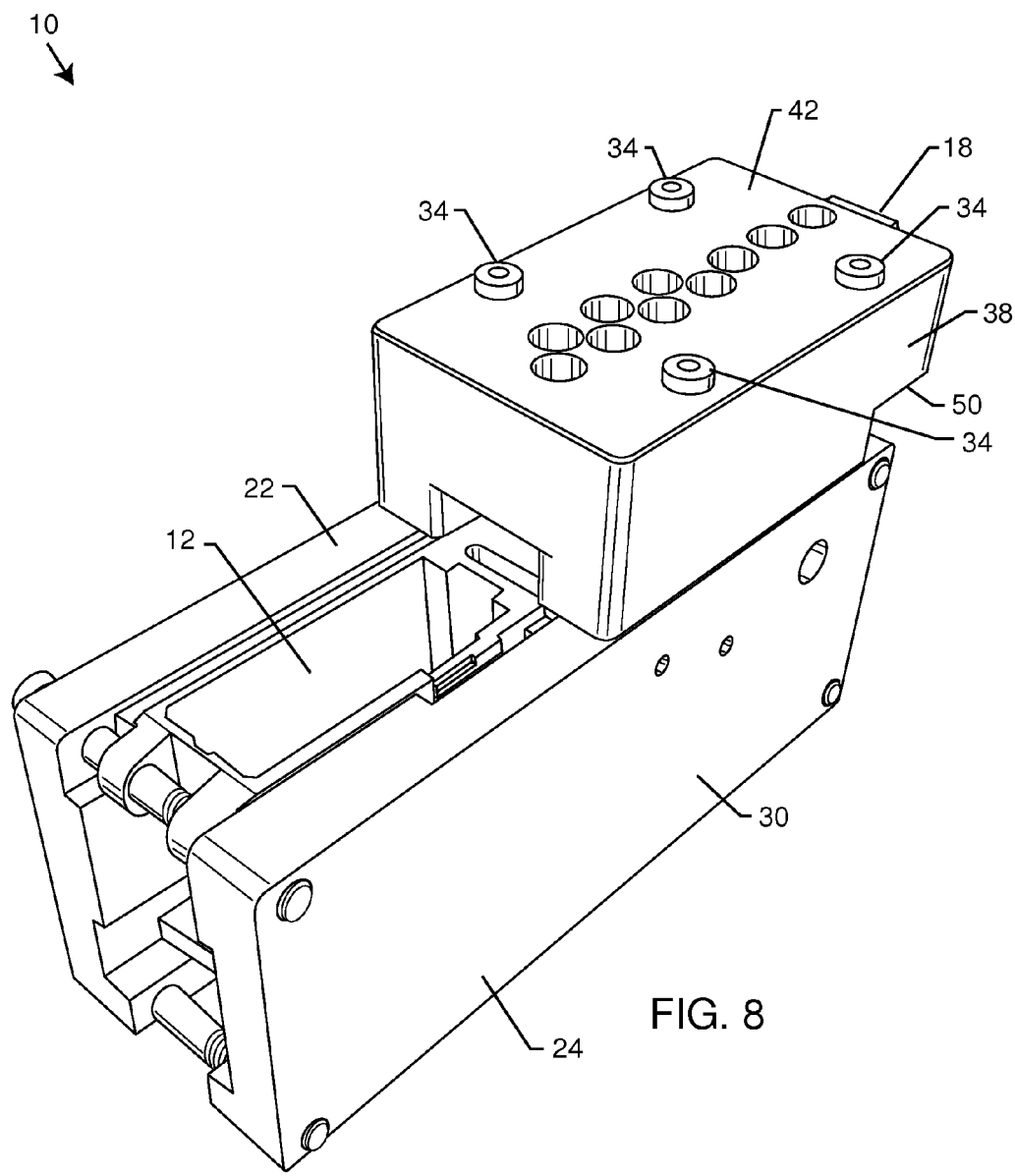
FIG. 8 is a perspective view of the structure of FIGS. 1-5 now with the structure of FIGS. 6-7 combined.
Figures 9, 10, 11:
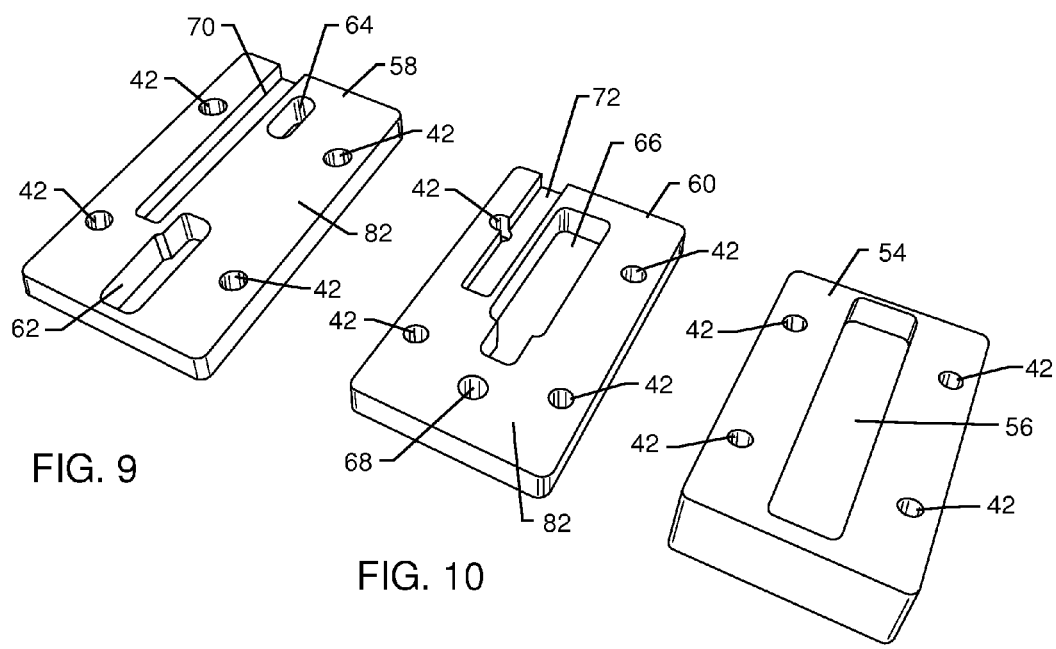
FIG. 9 is a perspective view of an embodiment of a pocket template.
FIG. 10 is a perspective view of another embodiment of a pocket template.
FIG. 11 is a perspective view of an embodiment of a template spacer jig.
Figures 12, 13, 14:
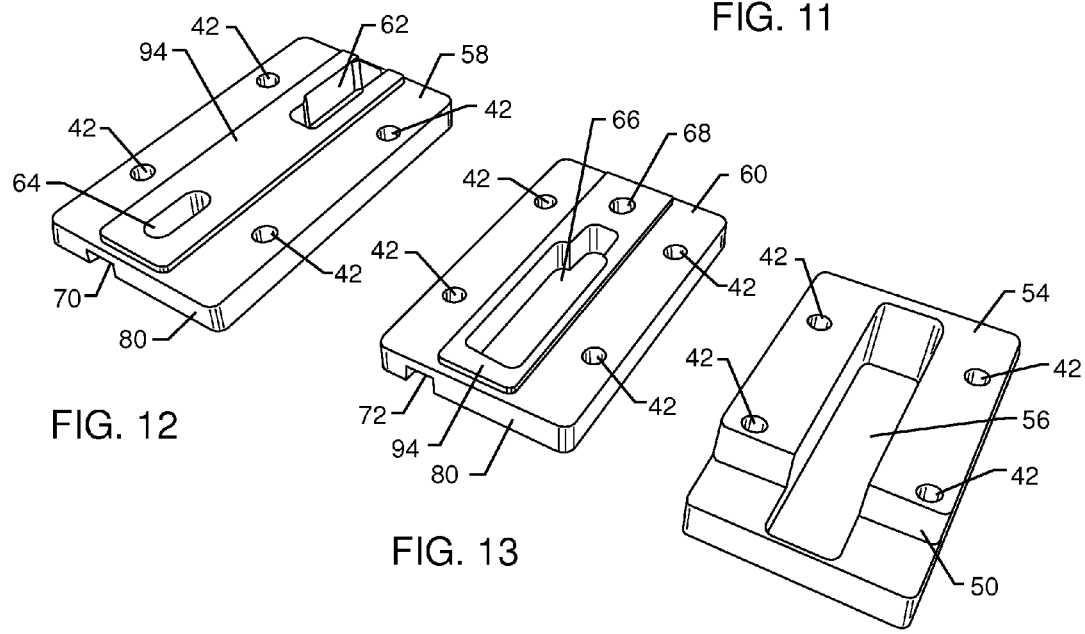
FIG. 12 is a different perspective view of the structure of FIG. 9.
FIG. 13 is a different perspective view of the structure of FIG. 10.
FIG. 14 is a different perspective view of the structure of FIG. 11.
Figure 18:
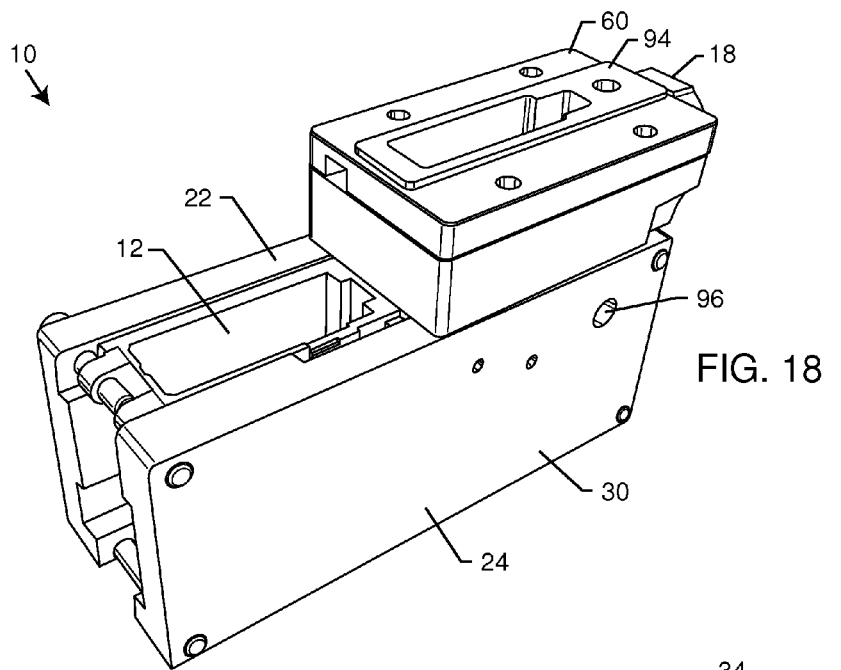
FIG. 18 is a perspective view of the pocket template of FIG. 10 assembled upon the template spacer jig.

A drill block jig 38 is removably attachable to the first and second side jigs 22 and 24 disposed on top of and above the top surface 16 of the firearm lower receiver 12. As is best seen in FIG. 8, fasteners 34 can be used to bolt/attach the drill block jig 38 through the through holes 42 to the internal threads 40 of the side jigs 22 and 24. In this embodiment the top surface 42 of the drill block jig 38 is equal to or above the uppermost part of the buffer tube receiver extension 18 when it is attached to the assembly.

The drill block jig 38 can now provide a plurality of drill hole guides 44 or otherwise known in the claims as a plurality of through holes. As shown herein there are ten drill hole guides 44. However, any number or size of drill hole guides 44 may be used such that a user can start to drill out material from within the lower receiver 12. This embodiment has attempted to optimize the number and size of the plurality of drill hole guides 44 to reduce machining time, however, other variations on size and number of guides is possible to those skilled in the art. The plurality of through holes (drill block guides) define axes oriented perpendicular to the top plane 14 of the firearm lower receiver 12 when the drill block jig 38 is attached to the firearm lower receiver 12.

The drill block jig 38 also has a longitudinal slot 46 formed within its lower surface 48. This longitudinal slot 46 allows for a space/gap such that machining particles can be blown out or removed during the drilling operations. Also, the drill block jig 38 has a cutout 50 along its back end 52. The cutout 50 allows space such that it doesn't interfere with the buffer tube receiver extension 18 when assembled.

After the drilling is done to the lower receiver 12 with the help of the drill block jig 38, the drill block jig 38 is removed to make way for the template spacer jig 54. The template spacer jig 54 may be removably attachable to the first and second side jigs 22 and 24 and disposed on top and above the top surface 16 of the firearm lower receiver 12. The template spacer jig 54 comprises a spacer aperture 56 disposed through a template spacer thickness, wherein the spacer aperture 56 is oriented perpendicularly through the top plane 14 of the firearm lower receiver 12 when the template spacer jig 54 is attached to the firearm lower receiver 12. The template spacer jig also has through holes 42 similar to the through holes 42 of the drill block jig 38. The through holes 42 attach and align the template spacer jig 54 with the lower receiver 12 when the fasteners 34 are used. The spacer aperture 56 is large enough to accommodate a hand router to be feed there through for routing of the lower receiver 12. The spacer aperture also has a cutout 50 such that it does not interfere with the buffer tube receiver extension 18.

This particular embodiment shown and taught herein uses two different pocket template plates, a first pocket template 58 and a second pocket template 60. Each of the pocket template plates 58 and 60 have a different aperture design/configuration disposed there through. Both the first pocket template 58 and the second pocket template 60 are removably attachable and disposed onto the template spacer jig 54. Each pocket template has through holes 42 that align with the through holes 42 of the template spacer jig.

The first pocket template 58 includes a first aperture 62 disposed through a first pocket template thickness, wherein the first aperture 62 is oriented perpendicularly through the top plane 14 of the firearm lower receiver 12 when the first pocket template 58 is attached to the template spacer jig 54. The first pocket template 58 also includes a second aperture 64 disposed through a first pocket template thickness, wherein the second aperture 64 is oriented perpendicularly through the top plane 14 of the firearm lower receiver 12 when the first pocket template 58 is attached to the template spacer jig 54.

The second pocket template 60 includes a third aperture 66 disposed through a second pocket template thickness, wherein the third aperture 66 is oriented perpendicularly through the top plane 14 of the firearm lower receiver 12 when the second pocket template 60 is attached to the template spacer jig 54. The second pocket template 60 also includes a drill hole guide 68 disposed through the second pocket template thickness.

To facilitate the ease of setting drill depths, any of the components described and shown herein can include a first depth gauge feature 70 and a second drill depth feature 72. The drill depth features 70 and 72 are shown herein as integrated into the first and second pocket templates 58 and 60. The drill depth features also include a plurality of drill depth indicators/markings 74. These features help the user to quickly and easily set drill depths without the need for auxiliary measurement tools such as calipers or rulers. Once can easily use the drill depth features to set the depth needed for each drilling process. The drill depth feature is a slot 76 formed in a first surface 82 which has one end open 78 to an edge surface 80, where the edge surface 80 is perpendicular to the first surface 82. The slot 76 may further include a closed end 84 that is opposite of its one open end 78. The drill depth features 70 and 72 may be formed on separate component parts, on the same component part or even on an auxiliary part that is added to the assembly.

Figure 19:
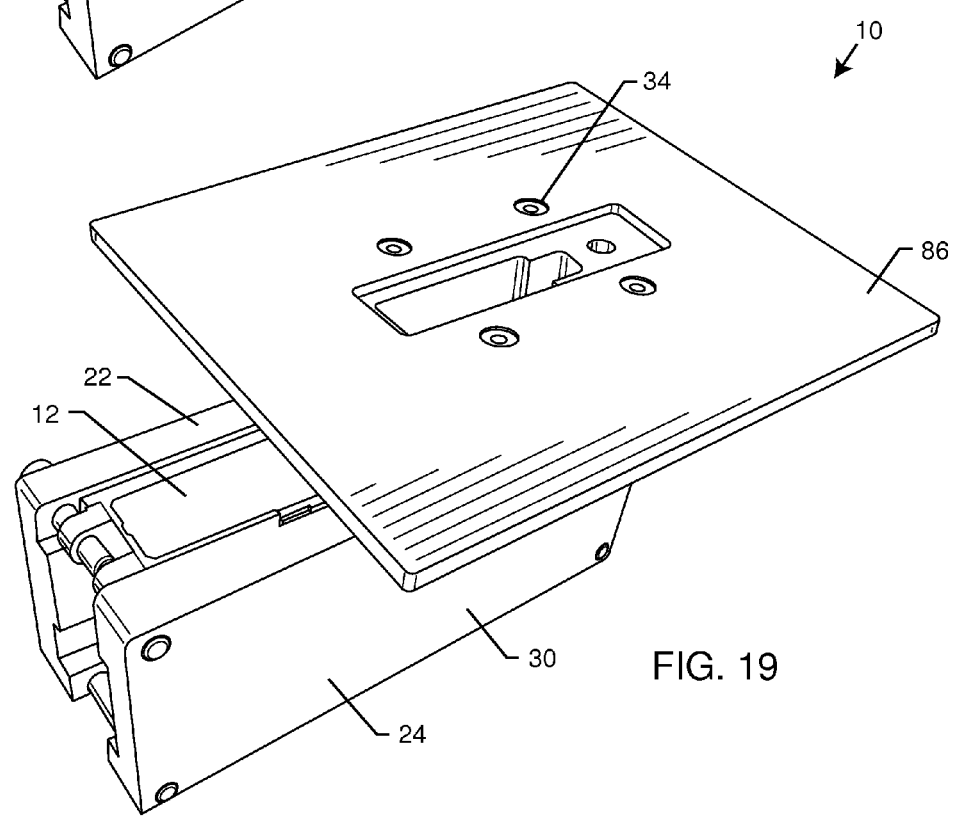
FIG. 19 is a perspective view of the structure of FIG. 18 now with the router support plate of FIG. 17.
Figure 20:
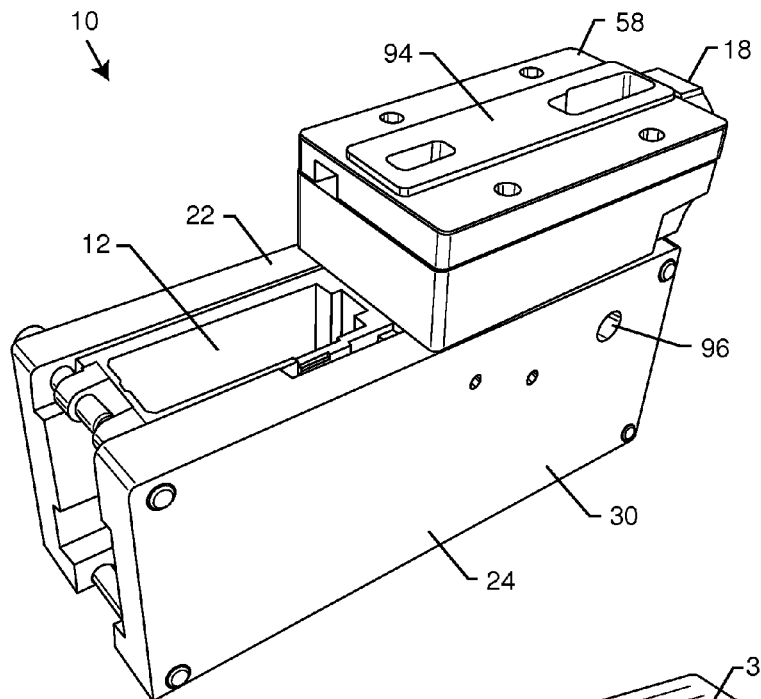
FIG. 20 is a perspective view of the pocket template of FIG. 9 assembled upon the template spacer jig.
Figure 21:
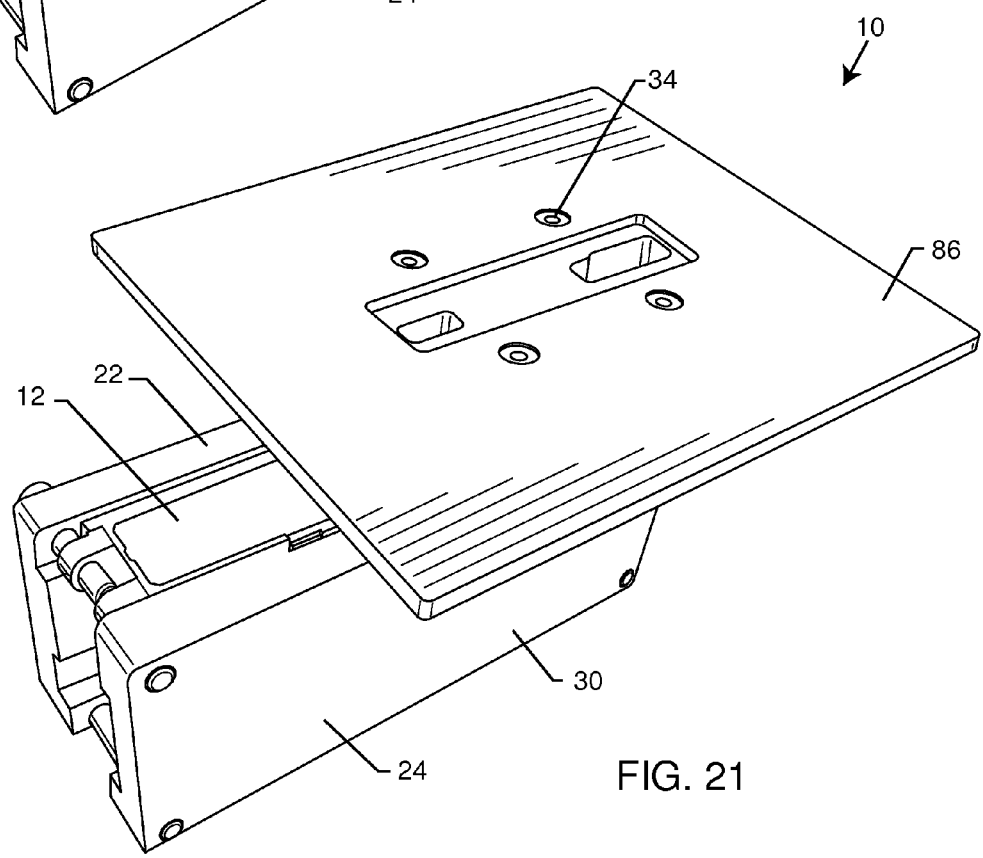
FIG. 21 is a perspective view of the structure of FIG. 20 now with the router support plate of FIG. 17.

A router support plate 86 is disposed onto either the first or second pocket templates (as shown in FIG. 19 or FIG. 21) and attachable to the first and second side jigs through the first or second pocket templates and the template spacer jig. The router support plate 86 includes a router aperture 88 disposed through a router support plate thickness, wherein the router aperture 88 is oriented perpendicularly through the top plane 14 of the firearm lower receiver 12 when it is attached onto the first or second pocket templates. A top surface 90 of the router support plate is disposed equal to or above the buffer tube receiver extension 18. The top surface 90 of the router support plate 86 needs to be large enough such that it can easily support a hand router upon it. Therefore, the top surface 90 may be at least ten square inches, or may be least twenty square inches or may be at least forty square inches.

The router support plate includes a plurality of fixturing holes 92 disposed through the router support plate thickness, where the plurality of fixturing holes 92 are countersunk. The holes 92 are not to be through holes as that would not work. As can be seen in FIG. 17, the fixturing hole 92 is countersunk but still has a smaller diameter hole at the bottom such that it can be engaged and bolted down by a fastener 34. The holes 92 are countersunk such that the head of the fastener is equal to or below the top surface 90 such that a hand router can easily be manipulated over the top surface 90. The holes 92 are configured to be aligned with the holes 42 of the first and second pocket templates and the template spacer jig.

To help alignment and assembly of the router support plate 86, the first and second pocket templates have a raised surface 94. The raised surface 94 is sized just right such that it nests within the router aperture 88 and helps to align the router support plate 86 during assembly.

In another embodiment, the template spacer jig 54 may be eliminated as its function can be integrated into both the first and second pocket templates 58 and 60. This means that the first and second pocket templates would be much thicker in size such that the template spacer jig 54 was not needed.

In another embodiment not shown, the plurality of fixturing holes 42 for the template spacer jig, the first pocket template and the second pocket template when attached to the firearm lower receiver may be asymmetrical with respect to a left side and a right side of the firearm lower receiver 12. This may be done such that it is impossible to improperly assembly or orient the various jigs during use. Sometimes mistakes may be inadvertently made and having a one way only method of assembly could be beneficial to reduce user error.

The first side jig 22 and the second side jig 24 also have a guide hole 96 disposed through their thickness. The guide hole 96 is used to guide a drill bit such that the lower receiver 12 may have a hole drilled through at the correct location.

Although several embodiments have been described in detail for purposes of illustration, various modifications may be made to each without departing from the scope and spirit of the invention. Accordingly, the invention is not to be limited, except as by the appended claims.

NUMERALS 10 machining tool assembly
12 firearm lower receiver
14 top plane
16 top surface
18 buffer tube receiver extension
20 internal thread
22 first side jig
24 second side jig
26 inner surfaces, side jig
28 outer surfaces, lower receiver
30 outer surfaces, side jigs
32 through holes
34 fasteners
36 internal thread
38 drill block jig 40 internal threads, side jigs, perimeter edge
42 through holes, drill block jig
44 drill hole guides
46 longitudinal slot
48 lower surface, drill block jig
50 cutout, drill block jig
52 back end, drill block jig
54 template spacer jig
56 spacer aperture
58 first pocket template
60 second pocket template
62 first aperture, first pocket template
64 second aperture, first pocket template
66 third aperture, second pocket template
68 drill hole guide, second pocket template
70 first drill depth feature
72 second drill depth feature
74 drill depth markings
76 slot
78 open end
80 edge surface
82 first surface
84 closed end
86 router support plate
88 router aperture
90 top surface, router support plate
92 countersunk holes
94 raised surface, first and second pocket templates
96 guide hole, first and second side jigs

What is claimed is:

1. A machining tool assembly comprising a plurality of separate components for manufacturing a firearm lower receiver, the firearm lower receiver defining a top plane that is aligned with a top surface of firearm lower receiver but below a buffer tube receiver extension of the firearm lower receiver, the assembly comprising:
a first side jig and a second side jig configured to be disposed on opposite sides of the firearm lower receiver and configured to removably attach to one another securing the firearm lower receiver therebetween;
a drill block jig removably attachable to the first and second side jigs disposed above the top surface of the firearm lower receiver, wherein the drill block jig comprises a plurality of through holes defining axes oriented perpendicular to the top plane of the firearm lower receiver when the drill block jig is attached to the firearm lower receiver;
a template spacer jig removably attachable to the first and second side jigs disposed above the top surface of the firearm lower receiver, wherein the template spacer jig comprises a spacer aperture disposed through a template spacer thickness, wherein the spacer aperture is oriented perpendicularly through the top plane of the firearm lower receiver when the template spacer jig is attached to the firearm lower receiver;
a first pocket template removably attachable and disposed onto the template spacer jig, wherein the first pocket template comprises a first aperture disposed through a first pocket template thickness, wherein the first aperture is oriented perpendicularly through the top plane of the firearm lower receiver when the first pocket template is attached to the template spacer jig;
a second pocket template removably attachable and disposed onto the template spacer jig, wherein the second pocket template comprises a second aperture disposed through a second pocket template thickness, wherein the second aperture is oriented perpendicularly through the top plane of the firearm lower receiver when the second pocket template is attached to the template spacer jig; and
a router support plate disposed onto either the first or second pocket template and attachable to the first and second side jigs through the first or second pocket templates and the template spacer jig, wherein the router support plate comprises a router aperture disposed through a router support plate thickness, wherein the router aperture is oriented perpendicularly through the top plane of the firearm lower receiver when it is attached onto the first or second pocket templates, and wherein a top surface of the router support plate is disposed equal to or above the buffer tube receiver extension.

2. The assembly of claim 1, wherein the top surface of the router support plate is at least 10 square inches.

3. The assembly of claim 1, wherein the top surface of the router support plate is at least 20 square inches.

4. The assembly of claim 1, wherein the top surface of the router support plate is at least 40 square inches.

5. The assembly of claim 1, wherein the router support plate comprises a plurality of fixturing holes disposed through the router support plate thickness, where the plurality of fixturing holes are countersunk.

6. The assembly of claim 1, including a depth gauge feature formed in at least one of the plurality of separate components, wherein the depth gauge feature comprises a slot formed in a first surface of its respective part, where the slot has one end open to an edge surface, where the edge surface is perpendicular to the first surface.

7. The assembly of claim 6, wherein the slot further comprises a closed end that is opposite of its one open end.

8. The assembly of claim 7, wherein the depth gauge feature comprises a plurality of depth indicators formed on the first surface or on an additional surface adjacent to the depth gauge feature.

9. The assembly of claim 1, wherein the first aperture and second aperture comprise a different shape.

10. The assembly of claim 1, wherein the router support plate comprises a plurality of fixturing holes disposed through the router support plate thickness, where the plurality of fixturing holes are countersunk.

11. The assembly of claim 10, wherein the template spacer jig, the first pocket template and the second pocket template each comprise a plurality of fixturing holes that are aligned with each other and aligned with the plurality of fixturing holes of the router support plate.

12. The assembly of claim 11, wherein the plurality of fixturing holes for the template spacer jig, the first pocket template and the second pocket template when attached to the firearm lower receiver are asymmetrical with respect to a left side and a right side of the firearm lower receiver.

13. An assembly comprising a plurality of separate components used for tooling to manufacturer a firearm lower receiver, the firearm lower receiver defining a top plane that is aligned with a top surface of firearm lower receiver but below a buffer tube receiver extension of the firearm lower receiver, the assembly comprising:
a drill block jig removably attachable to the firearm lower receiver and disposed above the top surface of the firearm lower receiver, wherein the drill block jig comprises a plurality of through holes disposed through a drill block jig thickness, wherein the plurality of through holes define axes which are oriented perpendicular to the top plane of the firearm lower receiver when the drill block jig is attached to the firearm lower receiver; and a router support plate removably attachable to the firearm lower receiver and disposed above the top surface of the firearm lower receiver, wherein a top surface of the router support plate is disposed parallel to the top plane of the of the firearm lower receiver and is further disposed at a height that is equal to or above an upper most portion of the buffer tube receiver extension, wherein the router support plate comprises a router aperture disposed through a router support plate thickness, and wherein the router aperture is oriented perpendicularly through the top plane of the firearm lower receiver when the router support plate is attached to the firearm lower receiver.

14. The assembly of claim 13, wherein the top surface of the router support plate is at least 10 square inches.

15. The assembly of claim 13, wherein the top surface of the router support plate is at least 20 square inches.

16. The assembly of claim 13, wherein the top surface of the router support plate is at least 40 square inches.

17. The assembly of claim 13, wherein the router support plate comprises a plurality of fixturing holes disposed through the router support plate thickness, where the plurality of fixturing holes are countersunk.

18. The assembly of claim 13, including a depth gauge feature formed in at least one of the plurality of separate components or in an additional component, wherein the depth gauge feature comprises a slot formed in a first surface of its respective part, where the slot has one end open to an edge surface, wherein the edge surface is perpendicular to the first surface and wherein the slot further comprises a closed end that is opposite of its one open end.

19. The assembly of claim 18, wherein the depth gauge feature comprises a plurality of depth indicators formed on the first surface or on an additional surface adjacent to the depth gauge feature.

20. The assembly of claim 13, wherein the router support plate is configurable to comprise a first aperture in a first configuration and a second aperture in a second configuration.

21. The assembly of claim 20, wherein the first aperture and second aperture comprise a different shape.

22. The assembly of claim 13, wherein a first pocket template is removably attachable to the router support plate, wherein the first pocket template comprises a first aperture disposed through a first pocket template thickness.

23. The assembly of claim 22, wherein a second pocket template is removably attachable to the router support plate, wherein the second pocket template comprises a second aperture disposed through a second pocket template thickness, wherein the first aperture comprises a different shape from the second aperture.

24. An assembly comprising a plurality of separate parts for manufacturing a firearm lower receiver, the firearm lower receiver defining a top plane that is aligned with a top surface of firearm lower receiver but below a buffer tube receiver extension of the firearm lower receiver, the assembly comprising:
   a drill block jig removably attachable to the firearm lower receiver and disposed above the top surface of the firearm lower receiver, wherein the drill block jig comprises a plurality of through holes disposed through a drill block jig thickness, wherein the plurality of through holes defines axes which are oriented perpendicular to the top plane of the firearm lower receiver when the drill block jig is attached to the firearm lower receiver;
   a router support plate removably attachable to the firearm lower receiver and disposed above the top surface of the firearm lower receiver, wherein a top surface of the router support plate is disposed parallel to the top plane of the of the firearm lower receiver and is further disposed at a height that is equal to or above an upper most portion of the buffer tube receiver extension, wherein the router support plate comprises a router aperture disposed through a router support plate thickness, and wherein the router aperture is oriented perpendicularly through the top plane of the firearm lower receiver when the router support plate is attached to the firearm lower receiver; and
   a depth gauge feature formed either in the drill block jig or in the router support plate or in an additional part, wherein the depth gauge feature comprises a slot formed in a first surface of its respective part, where the slot has one end open to an edge surface, wherein the edge surface is perpendicular to the first surface and wherein the slot further comprises a closed end that is opposite of its one open end.

25. The assembly of claim 24, wherein the top surface of the router support plate is at least 10 square inches.

26. The assembly of claim 24, wherein the top surface of the router support plate is at least 20 square inches.

27. The assembly of claim 24, wherein the top surface of the router support plate is at least 40 square inches.

28. The assembly of claim 24, wherein the router support plate comprises a plurality of fixturing holes disposed through the router support plate thickness, where the plurality of fixturing holes are countersunk.

29. The assembly of claim 24, wherein the depth gauge feature comprises a plurality of depth indicators formed on the first surface or on an additional surface adjacent to the depth gauge feature.

30. The assembly of claim 24, wherein the router support plate is configurable to comprise a first aperture in a first configuration and a second aperture in a second configuration.

31. The assembly of claim 30, wherein the first aperture and second aperture comprise a different shape.

32. The assembly of claim 24, wherein a first pocket template is removably attachable to the router support plate, wherein the first pocket template comprises a first aperture disposed through a first pocket template thickness.

33. The assembly of claim 32, wherein a second pocket template is removably attachable to the router support plate, wherein the second pocket template comprises a second aperture disposed through a second pocket template thickness, wherein the first aperture comprises a different shape from the second aperture.

* * * * *